(12) United States Patent
Tillmann et al.

(10) Patent No.: US 8,564,244 B2
(45) Date of Patent: Oct. 22, 2013

(54) BATTERY WITH BATTERY CELLS AND METHOD FOR MONITORING AND CONTROLLING THE BATTERY CELLS OF THE BATTERY

(75) Inventors: Stefan Tillmann, Berlin (DE); Nevzat Güner, Berlin (DE); Markus Schweizer-Berberich, Berlin (DE); Torsten Stichowski, Magdeburg (DE)

(73) Assignee: Temic Automotive Electric Motors GmbH, Berlin (DE)

( * ) Notice: Subject to any disclaimer, the term of this patent is extended or adjusted under 35 U.S.C. 154(b) by 358 days.

(21) Appl. No.: 12/995,484

(22) PCT Filed: Jun. 4, 2009

(86) PCT No.: PCT/DE2009/000768
§ 371 (c)(1),
(2), (4) Date: Feb. 16, 2011

(87) PCT Pub. No.: WO2009/149690
PCT Pub. Date: Dec. 17, 2009

(65) Prior Publication Data
US 2011/0127961 A1 Jun. 2, 2011

(30) Foreign Application Priority Data
Jun. 9, 2008 (DE) .......................... 10 2008 027 417

(51) Int. Cl.
*H02J 7/00* (2006.01)
(52) U.S. Cl.
USPC ......................................................... 320/116
(58) Field of Classification Search
USPC ......................................................... 320/116
See application file for complete search history.

(56) References Cited

U.S. PATENT DOCUMENTS

| | | | |
|---|---|---|---|
| 5,504,415 A * | 4/1996 | Podrazhansky et al. | 320/118 |
| 5,825,155 A * | 10/1998 | Ito et al. | 320/118 |
| 6,641,942 B1 | 11/2003 | Rouillard et al. | |
| 6,773,848 B1 | 8/2004 | Nortoft et al. | |
| 2001/0003863 A1 * | 6/2001 | Thibault et al. | 29/623.1 |
| 2002/0064708 A1 | 5/2002 | Asahina et al. | |
| 2002/0117997 A1 * | 8/2002 | Feil et al. | 320/132 |
| 2003/0190520 A1 | 10/2003 | Amine et al. | |
| 2006/0132089 A1 * | 6/2006 | Ambrosio et al. | 320/107 |
| 2008/0081252 A1 | 4/2008 | Miyazaki | |

FOREIGN PATENT DOCUMENTS

DE 197 05 192 A1 10/1997
DE 10 2007 046043 A1 4/2008

* cited by examiner

*Primary Examiner* — Arun Williams
(74) *Attorney, Agent, or Firm* — RatnerPrestia (57) ABSTRACT

The invention relates to a battery with battery cells and a method for monitoring and controlling the battery cells of the battery. The battery has a plurality of battery cell stacks which are connected in series. A battery cell stack may have an individual battery cell or may be constructed from battery cells which are connected in parallel. Sensors monitor the charge state of individual battery cells, individual battery cell stacks, individual pairs of battery cells and/or individual pairs of battery cell stacks. A charge compensation device has a target value table of the permissible charge state of individual battery cells. The charge compensation device varies the charge compensation depending on the charge state and, when the target value for the charge state of individual battery cells is reached, the charge compensation of the battery cells is interrupted.

25 Claims, 4 Drawing Sheets

BATTERY WITH BATTERY CELLS AND METHOD FOR MONITORING AND CONTROLLING THE BATTERY CELLS OF THE BATTERY

CROSS REFERENCE TO RELATED APPLICATIONS

This application is the U.S. National Phase Application of PCT International Phase Application No. PCT/DE2009/000768, filed Jun. 4, 2009, which claims priority to German Patent Application No. DE 10 2008 027 417.8, filed Jun. 9, 2008, the contents of such application being incorporated by reference herein.

FIELD OF THE INVENTION

The invention relates to a battery with battery cells and a method for monitoring and controlling the battery cells. For this purpose, the battery has a plurality of battery cell stacks which are connected in series, wherein a battery cell stack can have an individual battery cell or can be constructed from battery cells which are connected in parallel. Sensors monitor the charge state of individual battery cells or individual battery cell stacks or individual pairs of battery cells or individual pairs of battery cell stacks.

BACKGROUND OF THE INVENTION

For coupling and providing a battery stack a battery module and a method for its production are known from DE 10 2007 046 043 A1, which is incorporated herein by reference. Such a battery module represents a battery cell stack and couples a first and a second battery cell to each other via a connecting element from a metal sheet. This connecting element according to the state of the art is formed from a tube and has a bottom part and a side wall. The bottom part in turn has an outer edge element, which is welded to a bottom wall of the battery cell housing of the second stacked battery cell, while an inner edge element is welded within the outer edge element to a locking plate of the first battery cell. Such a battery stack of two battery cells stacked one onto the other results in a battery module, which consists of stacked batteries which are connected in series, whereby the voltage is doubled and the storage capacity corresponds to an individual battery cell.

A disadvantage of this battery stack is that it is not possible to increase the storage capacity by parallel connection of the stacked battery cells via the disclosed connecting element.

From U.S. 2002/0064708 A1, which is incorporated herein by reference, a battery module made of prismatic battery cells is known, which has also a plurality of prismatic battery cells connected in series, wherein positive and negative electrical tags are alternately stacked via a separator and flat conductor connections are connected to each other on opposite sides by protruding portions of the positive and negative electrical tags. Here, bus bars on the flat conductor sections on both sides of the electrode tags are connected to groups while using an electrically conductive adhesive or the like. These groups of electrode tags are in turn serially connected to each other and then the spaces between the bus bars and the battery wall are molded with a non-conductive material to isolate the many battery cells from each other. Here, a construction is achieved, which in fact makes it possible to shorten the electrical connecting paths and thus to decrease the internal resistance, however, with this connection technology merely the total voltage of the battery can be increased, however, not the ability to receive and deliver current, i.e. the capacity of the battery cannot be improved.

SUMMARY OF THE INVENTION

It is, therefore, an object of the invention to create a battery with battery cells and a method for monitoring and controlling the battery cells, with which the internal resistance is reduced and with the option to increase at will the storage capacity by the suitable stacking of battery cells.

According to aspects of the invention a battery with battery cells and a method for monitoring and controlling the battery cells is created, in which the battery has a plurality of battery cell stacks which are connected in series. Here, a battery cell stack can have an individual battery cell or can be constructed from battery cells which are connected in parallel. Sensors monitor the charge state of individual battery cells or individual battery cell stacks or individual pairs of battery cells or individual pairs of battery cell stacks. A charge compensation device has a target value table of the permissible charge state of individual battery cells. The charge compensation device varies the charge compensation depending on the charge state and, when the target value for the charge state of individual battery cells is reached, the charge compensation of the battery cells is interrupted. In this case, pole connections of the battery cells or of the battery cell stacks are welded to one another in pairs via weld areas and are electrically connected to the weld areas via charge compensation lines.

Preferably, the connection of pairs of pole connections with the charge compensation lines has an additional weld connection, which is applied for example by means of ultrasonic welding on the pairs of pole connections with a reduced energy input. Such a battery concept has the advantage that with the aid of standard battery cells the capacity of the battery can be increased at will by stacking the battery cells while simultaneously connecting similar pole connections and in addition that by the series connection of such battery stacks an almost unlimited voltage increase can be realized.

The prismatic variant of battery cells used according to the aspects of the invention can be equipped with a rigid housing or with a flexible foil per battery cell. These flat cells can be connected via pole connections in serial connection in order to increase the voltage and thus the power of the system. In order to further increase the capacity, in each case also several cells can be connected in parallel. Whereas serially up to some thousand cells preferably several hundred battery cells lead to a corresponding high output voltage, up to 50 cells are preferably connected two to four cells in parallel and then these groups of cells are connected in series with one another. The connection is preferably performed by ultrasonic welding, since the process can take place without introducing much heat into the cell. When introducing too much heat into the cell, with temperatures higher than 100° C. this can result in an irreversible damage of the battery, such as for example a melting and/or a shrinkage of the separator with a subsequent short-circuit.

With a connection of several battery cells to larger battery units preferably for achieving a long-term-stable system the cells are currently adapted to one another in their charge state. This process of symmetrisation of the cells can preferably take place in states of rest of the battery. It is, however, also possible to accomplish the symmetrisation by a suitable circuit electronics during use of the battery. A further advantage of the battery according to an aspect of the invention is that for all designs and uses in high power classes, like e.g. with hybrid applications and with power supply applications in the automobile as well as with the power supply as buffers, such as with wind energy plants and with photovoltaics, it can be composed of several hundred cells. For increasing the capacity, as is already described above, these cells can be connected in parallel or for increasing the voltage it can be connected in series, so that preferably for the application in automotive engineering systems with the concept according to aspects of the invention for 400 to 800 V short term powers of several hundred kW of energy can be achieved.

In a form of embodiment with the arrangement of battery cells in a battery housing mechanical manufacturing tolerances are almost compensated by the weld connections of the pairs of pole connections. Here, tolerances are compensated by bending and welding via the anvil.

For trucks and energy supply systems clearly larger systems can be applied with the concept according to aspects of the invention, wherein a life time of more than ten years can be achieved. For the process of symmetrisation, as is mentioned above, preferably the charge state, also called SOC, is determined by a voltage measurement for each individual battery cell. Via a current integration the used and re-loaded charge quantity is determined from the current-time-curve. As a reference and/or for recalibration the value calculated from the current integration can be compared with the charge voltage relation of the battery. Such a charge determination is made integratively, so that the measurement is to be accomplished over a long period of time. In order to faster reach a higher accuracy, preferably depending on the used cell chemistry a characteristic charge state voltage curve is stored in a charge compensation device and is deposited in an evaluation algorithm. By comparing the two values the charge state for the entire system of the battery can be determined with a satisfactory accuracy.

However, by self-discharge, shunt, aging, changes of operating conditions, temperature changes etc. these values can shift. However, the determination of the condition of the individual battery cell within the group of battery cells of the battery cannot be ensured by the charge condition voltage curve. Therefore, according to aspects of the invention the voltages of the individual cells or individual cell stacks are additionally measured and evaluated. Thus, it is possible to use especially lithium ion battery cells for the battery according to aspects of the invention. By the individual monitoring by means of CSCs (cell supervision circuits) or by means of CSMs (cell supervision modules) an overcharging or an over de-charging of the battery cells is prevented, so that no damages of the battery cell and thus of the entire battery can occur.

A requirement, which is complied with according to aspects of the invention, is an electrically and mechanically safe contact, since a loose contact or an interruption can lead to a shutdown of the battery, and since a failure of an individual voltage measurement due to safety reasons can lead to the total failure of the battery. Therefore, the charge state long term is steadily monitored by accurate measurement of the cell potential. For this purpose, beside a good contact at each individual battery cell also a high uniformity of the electrical resistance of the respective contacts for the large number of connections within the battery and between the individual battery cells is complied with according to aspects of the invention.

One embodiment of the invention makes it possible, to automate the production of the contacts between the monitoring circuits and/or the monitoring switching modules and the battery cells. Here, according to aspects of the invention a high value was set on safety at work, particularly since the cells are already partly charged during the connection process. With a larger cell group several 100 V (Volt) occur at potential differences between the components. Thereby, the cells can supply very high currents so that an error can entail a serious risk for the staff and for the tools. According to aspects of the invention a method is proposed which ensures the electrical protection.

For the electronics of the battery according to aspects of the invention either individual cell monitoring circuits for each individual battery cell are provided or an adjusted number of cells is tested by a cell monitoring module. A cell monitoring module then has a number of cell monitoring circuits, which are combined with the associated electrical communication links and the cell contacts. The cell monitoring modules can be also equipped with additional mechanical components such as the housing for protection against moisture and mechanical damage as well as with the attachment elements to the battery modules. The embodiment of the cell monitoring modules is determined by the application and the design of the batteries and results in plurality of embodiments of the present invention.

Interconnection of the battery cells to battery stacks and to battery modules is made by means of cell binders and welding of battery poles. Since with prismatic battery cells used according to aspects of the invention the pole connections are typically foil conductors, it is possible to guarantee a reliable low impedance connection both for a serial and for a parallel interconnection of the battery cells. In this case, according to aspects of the invention with the parallel and series interconnection the resulting plane welded hollow connections are connected in addition with the monitoring electronics. In this case, the battery preferably comprises a charge compensation line to each battery cell for detecting and compensating the charge state. After welding of the pole connections this charge compensation line is applied on the plane connections with a low welding capacity. The welding of the large-scale pole connections, contact surfaces between 20 and 350 mm$^2$, is effected by the fact that at first the pole connections stand vertically upward in the form of foil cell conductors. An anvil of an ultrasonic system is positioned between the battery cells and the pole connections of the battery cells to be connected are bent flat over the anvil. This can take place manually with a tool or via an automatically controlled mechanism. On these flat bent pole connections the ultrasonic probe is then placed from above for introducing energy of the ultrasonic activator, causing the pole connections located on one the other to be plane welded. In doing so, the U-shaped connections of the battery cells represented in FIGS. 3 to 6 are created. This welding can be performed per pair of cells.

By the material engagement the ultrasonic welding offers an extremely low contact resistance and a high mechanical stability. The connections of the pole connections are preferably age-resisting and unlike screwed connections they do not show an increase of the contact resistance with an increasing service life of the battery. With suitably selected parameters the mechanical stability is so large that in the tensile test and peel test the foil material tears, before the welded joint is again separated. Here, values of up to several thousand N tensile force are typical. Beside a connection of two foils welded one above the other also four, six or more layers of foil-like pole connections can be welded with one another. Such a configuration occurs e.g. with a serial interconnection of parallel arranged cells. For such large areas this composite can take place according to aspects of the invention only in several stages. These stages and/or steps cover subsequent measures. First, the pole connections of the first two battery cells to be connected are bent over an anvil with subsequent pre-welding of the pole connections. Thereafter, bending of the next pair of pole connections of the further cells with subsequent pre-welding of the pole connections can take place. Then, the main welding of the two pre-welded pairs of pole connections to a multi-layer composite takes place. This main welding can realize both parallel and serial connections of the battery cells with one another with one single welding process.

By bending the pole connections over an anvil of the ultrasonic system the level of the surfaces to be welded takes place automatically on the top of the anvil. This helps to compensate the tolerances, which arise before when gluing the pairs of battery cells on corresponding cooling plates, or by potential inaccuracies of the battery cell dimensions or when introducing the battery cells into a battery housing.

As already mentioned above, the batteries consist of a large number of battery cells to be monitored and symmetrized. Ideally, the battery cells are located in a battery cell housing, which guarantees the mechanical and electrical unit of each individual battery cell. These battery cell housings are, as is described above, electrically interconnected to abstract the energy. The top of the surfaces resulting during welding of the pole connections can additionally be used according to aspects of the invention, in order to attach to it taps such as cables, flat conductors or thin metal contacts for cell monitoring electronics. A prerequisite for attaching such taps for the cell monitoring electronics is an accurate positioning of the cell connection, as it is made according to aspects of the invention by the process described above.

Afterwards, applying of the taps in the form of cables, flat conductors or thin metal contacts for the monitoring electronics on this already existing flat ultrasonic welding connection can take place. Then, again an anvil is introduced, which for the contact welding is somewhat smaller than the anvil for the main welding, in order to fit into the present U-shaped connection. Finally, the ultrasonic probe is placed, which can be flat or designed as a nose. The nose-shaped ultrasonic probe is used with boards, in order to engage into a recess, in which cable flat conductors, metal foil or another metallic contact are located. As with this welding significantly smaller surfaces are required, in the range of 5 to 50 mm$^2$, it can be worked with a relatively small reduced energy at about 50 to 250 mW, which can no longer affect the previous welding of the main contact, since only about 10% of the energy of the pole connection weld for the welding of the taps for the charge compensation lines are required.

The electronics connected with the battery cells by the tap contact can be arranged either on a board or can contain the total circuits or can comprise a board, which unites the necessary connections to corresponding plugs, onto which then the control electronics is placed. According to aspects of the invention a wire harness is provided between the interfaces, which is collected and guided in a plastic component and which makes it possible to reach an interface board, which also allows for contacts for the connection to the battery cells and to the plug contacts and/or to the monitoring electronics.

Summarizing, it is to be stated that the aspects of the invention allows for the serial and parallel interconnection of cells in a single process with a good control of the tolerances. The joints of the main connection are the base for the connection to the control electronics. All connections are welded with ultrasound to ensure a high solidity, a low resistance and an improved long-term consistency. In addition, with the concept according to aspects of the invention tolerances can be well absorbed, which arise in the course of the production of the battery. All manufacturing steps offer the possibility to be automated what guarantees a high uniformity of the connections, short process times and small stack heights of the connections of the battery cells among each other as well as of the connection of the battery cells to the control electronics.

Thus, a space-optimized structure of the battery with prismatic battery cells in foil packing results, which uses an ultrasonic welding method to electrically interconnect the pole connections in serial and/or in parallel. The welding of the pole connections directly with each other supersedes the use of a connector, as it is usual with conventional batteries, by means of which joints, contact surfaces and weight can be saved.

The automated process of the welding of the battery cells is made in one sequence, which comprises at first a bending of the pole connections of each individual battery cell by an automatic gripper. Afterwards, the pre-welding for fixing several pole connections to each other is performed. Subsequently, the bending of the pole connections of a second battery cell can take place by an automatic gripper and again a pre-welding of the pole connections of the second cell can be performed. Finally, a main welding of the pole connections attached to each other will take place for generating serial and/or parallel contacts of the battery cells. Repeating of steps can be performed thereafter until the entire battery is continuously contacted. For this purpose, an engine-controlled module reception can be used, which positions the assembled module in a housing.

The pole connections connected in this way can be finally used to ensure a tap for the cell monitoring electronics with the aid of an ultrasonic welding. For this purpose, while using cell monitoring modules, which can consist of an interface board and/or a whole plate, or which contains a wire harness mould in plastic for mounting individual cell monitoring circuits, can be performed. For this purpose, preferably the monitoring circuit module and/or the CSM can consist of individual small monitoring circuits and/or CSCs with connections to an interface board or to a wire harness or to a flex board, which are protectively built into a housing. Such functions, however, can be combined also on a whole board or a collecting board, this board being in turn protected by the battery housing.

BRIEF DESCRIPTION OF THE DRAWINGS

The invention is best understood from the following detailed description when read in connection with the accompanying drawings. Included in the drawings is the following figures:

The invention is described in detail on the basis of the accompanying drawings, in which

FIGS. 3 to 6 show schematic plan views onto battery cells before and after welding to pairs of battery cells;

DETAILED DESCRIPTION OF THE PREFERRED EMBODIMENTS

Figure 1:
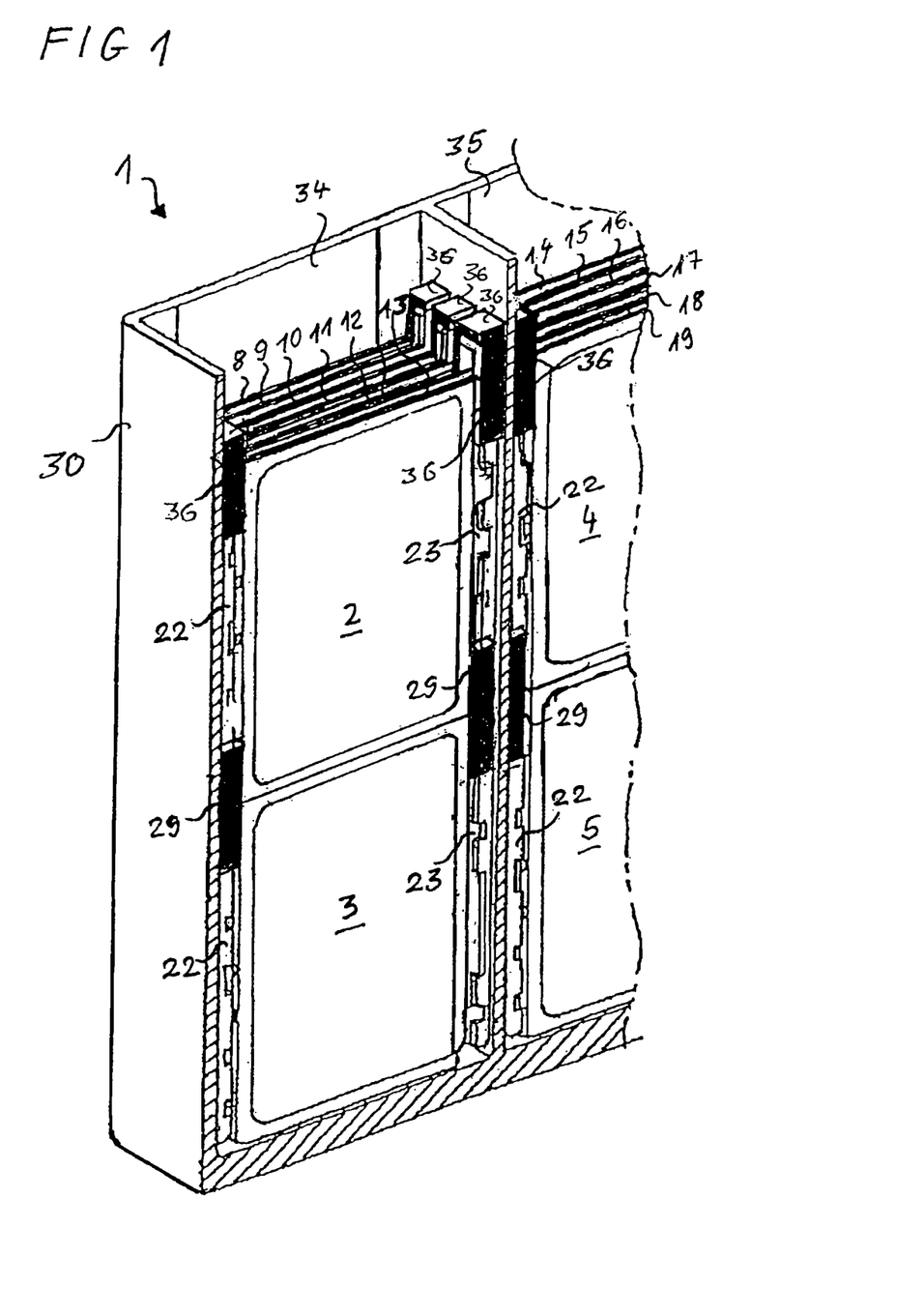
FIG. 1 shows a perspective view partly cut open of a battery in accordance with a first form of embodiment of the invention.

FIG. 1 shows a perspective view partly cut open of a battery 1 in accordance with a first form of embodiment of the invention. The battery 1 has a housing 30, in which in individual compartments 34 and 35 groups of battery cells 2 and 3 and/or 4 and 5 are arranged. Two battery cells 2 and 3 each form a parallel connected battery cell stack, wherein in the extract of the battery compartment 34 the battery cell stacks 8 to 13 can be seen. The positive pole connections 22 of each battery cell stack 8 to 13 are homopolar connected with each other via welding connections 29, so that the storage capacity is doubled compared with batteries with only an individual battery cell.

In the upper portion of the battery compartments 34 and 35 the battery cell stacks 8 to 13 are serially connected in the battery compartment 34, by unequal pole connections being welded with each other via the welding connections 36. For this purpose, the battery cell stacks 8 to 13 are rotated against each other by approx. 180° and are arranged one behind the other. Whereas in this way the battery cell stack 13 has connected the positive pole connections with each other on its left edge, the opposite negative pole connections of the battery cell stack 12 are connected with each other on the left side. On the right side the battery stack 12 has a positive pole section. The same applies to the battery cell stacks 14 to 19 in the second battery compartment 35 shown here.

Figure 2:
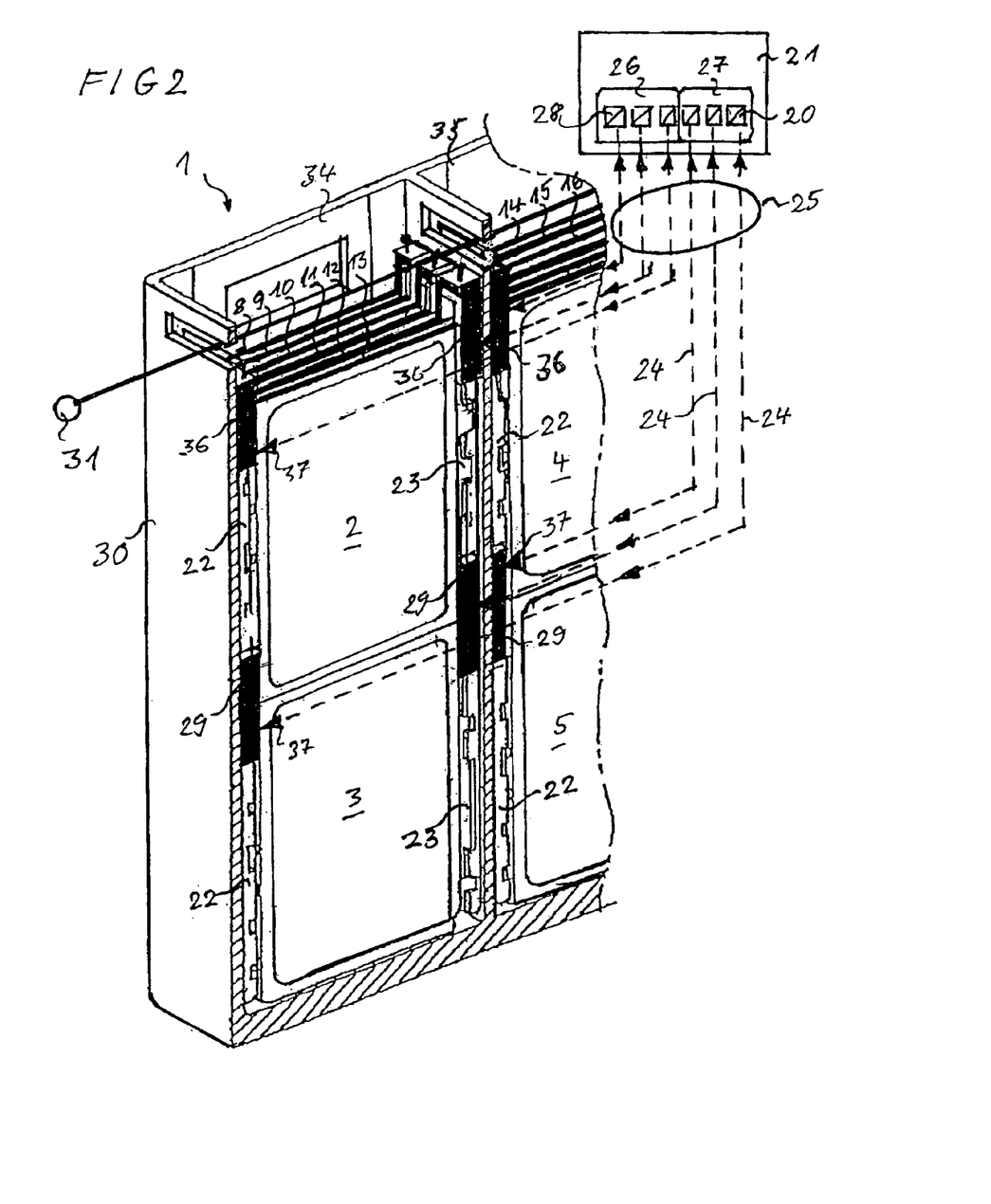
FIG. 2 shows a perspective view partly cut open of a battery in accordance with FIG. 1 with a cell monitoring module.

FIG. 2 shows a perspective view partly cut open of the battery 1 in accordance with FIG. 1 with a cell monitoring module. Components with same functions as in FIG. 1 are provided with same reference numerals and are not further described. The housing 30 comprises several openings, for example for a first external connection 31 and for possible multiple plugs for the connection of a plurality of charge compensation lines, which can lead to a central charge compensation device. In this form of embodiment illustrated in FIG. 2 it is, however, provided to arrange and weld at each battery cell 2, 3, 4 and 5 a tap 37 of a charge compensation line 24, wherein the different charge compensation lines 24 are combined in a wire harness 25 and cell monitoring modules 26 and 27 are supplied, which on their part comprise sensors 20 and cell monitoring circuits 28, wherein these components of the cell monitoring can be arranged together in a charge compensation device 21, this charge compensation device forming a central control board of the battery.

FIGS. 3 to 6 show schematic plan views onto battery cells before and after welding to pairs of battery cells.

Figure 3:
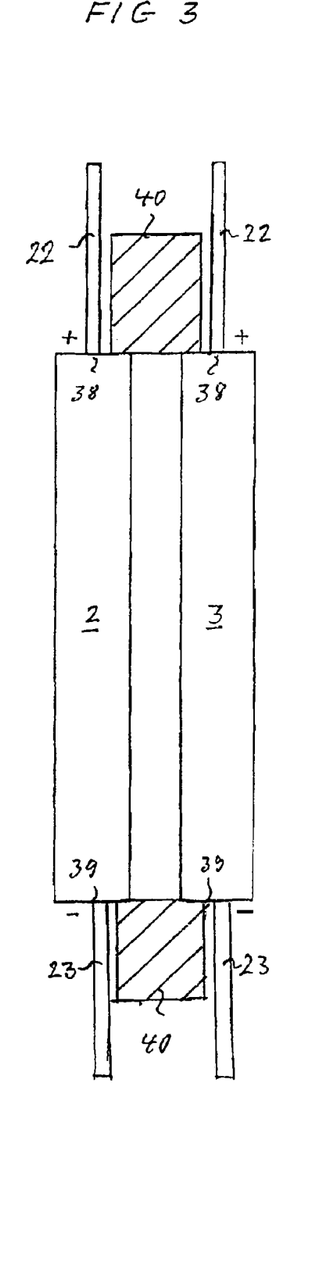
FIG. 3 shows a schematic plan view onto two battery cells with introduced anvil of an ultrasonic welding system.

FIG. 3 shows a schematic plan view onto two battery cells for a parallel circuit with introduced anvil of an ultrasonic welding system. In FIG. 3 the two lithium ion battery cells 2 and 3 are not yet electrically connected with one another to a pair of battery cells or to a battery cell stack. Whereas from the sides 38 positive pole connections 22 protrude, from the opposite sides 39 of the battery cells 2 and 3 negative pole connections 23 protrude. Between the pole connections 22 and/or 23 an anvil 40 of an ultrasonic welding system is positioned and the pole connections 22 and/or 23 are each folded towards the anvil 40, as is shown in FIG. 4.

Figure 4:
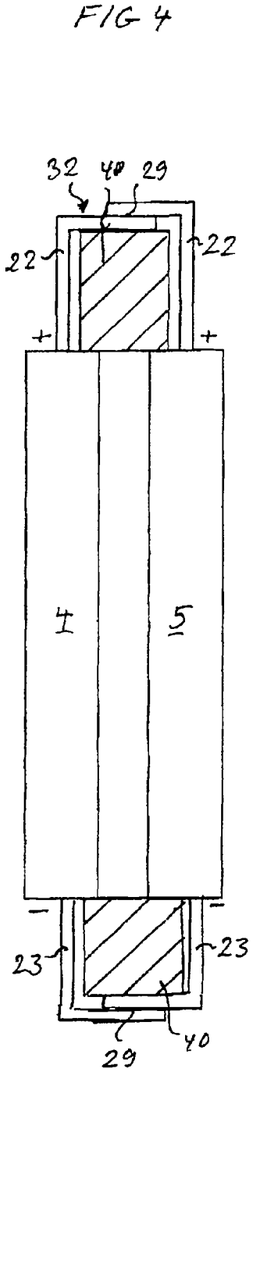
FIG. 4 shows a schematic plan view onto the battery cells in accordance with FIG. 3 after the bending of pole connections.
Figure 5:
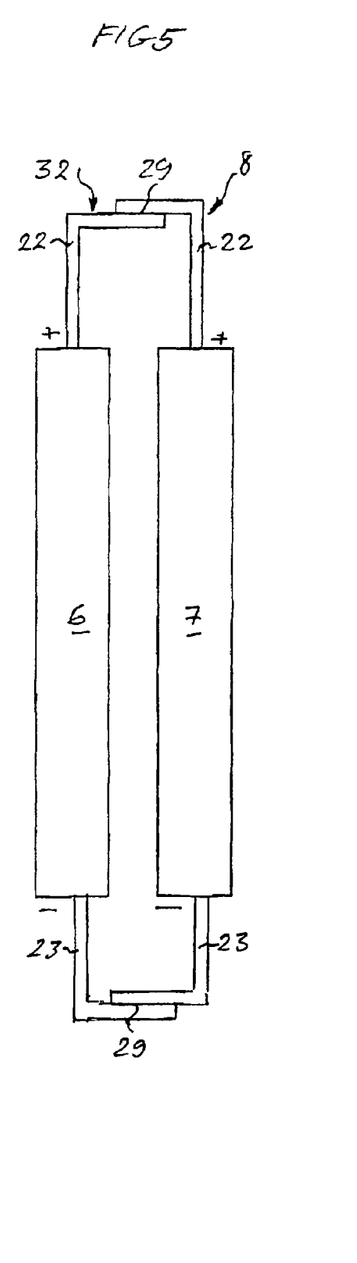
FIG. 5 shows a schematic plan view onto the battery cells in accordance with FIG. 4 after plane welding of the folded pole connections.

FIG. 4 shows a schematic plan view onto the battery cells in accordance with FIG. 3 after folding of the pole connections 22 and/or 23 on the anvil 40. With this folding the ends of the pole connections 22 and/or 23 rest homopolar one above the other, so that the positive poles and the negative poles are now parallel closed to increase the capacity of the battery to be produced. An ultrasonic electrode 23 is pressed onto these folded pole connections 22 and 23, so that a material-bonded welding connection 29 is formed, wherein thereafter the anvil 40 can be again withdrawn and the structure shown in FIG. 5 of a top of the battery cell stack 8 now connected in pairs results in a parallel circuit 32. The advantages of this structure have been already discussed above. Of course, on a such welding connection also a tap for charge compensation lines can be fixed.

Figure 6:
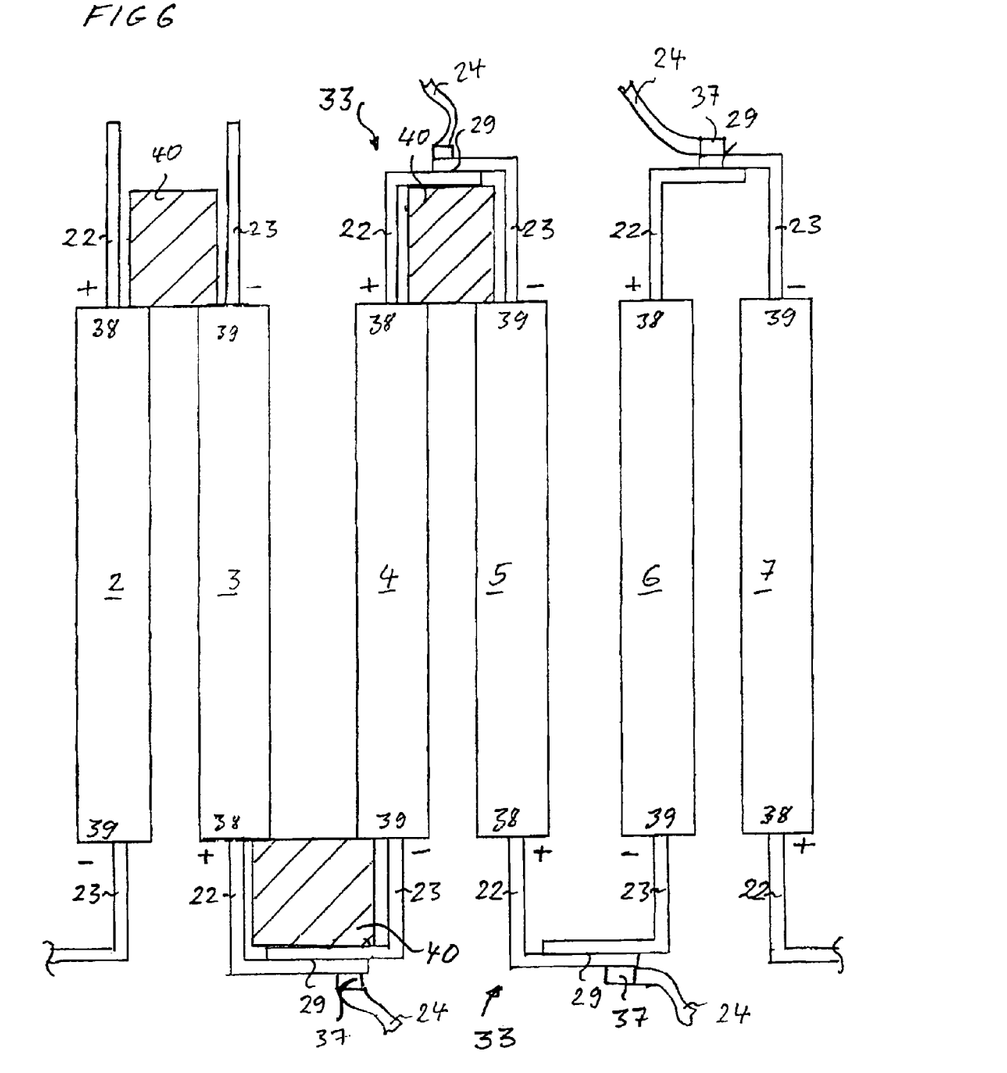
FIG. 6 shows a schematic plan view onto a serially welded group of battery cells.

FIG. 6 shows a schematic plan view onto a serially welded group of battery cells 2 to 7. In contrast to the preceding drawings in this case the battery cells 2 to 7 are connected to a series circuit 33 via their faces and the pole connections 22 and 23 protruding therefrom. Here, the first two battery cells 2 and 3 are not yet coupled to each other, but merely an anvil 40 of an ultrasonic system is arranged between the positive pole connection 22 of the battery cell 2 and the negative pole connection 23 of the battery cell 3. The positive pole connection 22 of the battery cell 3 is already folded towards each other over a further anvil 40 with the negative pole connection 23 of the battery cell 4, so that with the aid of an ultrasonic electrode these two antipole pole connections 22 and 23 can be connected with each other by material engagement. This applies also to the positive pole connection 22 of the battery cell 4, which with the aid of the ultrasonic system is already welded by material engagement with the negative pole connection 23 of the battery cell 5 and which has formed a welding connection 29. Also the serial connections between the battery cell 5, 6 and 7 are already present. On the pairs of pole connections in addition taps 37 for charge compensation lines 24 are welded by means of a reduced input of energy.

The invention claimed is:

1. A battery with battery cells comprising:
   a plurality of battery cell stacks which are connected in series, wherein a battery cell stack has an individual battery cell or battery cells which are connected in parallel;
   at least one sensor for monitoring the charge state of individual battery cells or individual battery cell stack or individual pairs of battery cells or individual pairs of battery cell stacks; and
   a charge compensation device;
   wherein the charge compensation device has a target value table of the permissible charge state of individual battery cells and depending on the charge state varies the charge compensation and when reaching the target value for the charge state of individual battery cells interrupts the charge compensation of the battery cells, wherein pole connections of the battery cells or of the battery cell stacks are welded to one another in pairs via weld areas, and wherein charge compensation lines are welded to the weld areas.

2. The battery according to claim 1, wherein a connection of pairs of pole connections to the charge compensation lines comprises an additional welding connection.

3. The battery according to claim 1, wherein the charge compensation device varies the charge states of the battery cells in such a manner that the charge states of the battery cells are adapted to each other.

4. The battery according to claim 1, wherein in the charge compensation device a charge state voltage curve of the entire system of the battery is stored.

5. The battery according to claim 1, wherein the plurality of battery cell stacks which are connected in series comprises up to several thousand battery cells and wherein the battery comprises up to 50 battery cells.

6. The battery according to claim 5, wherein the plurality of battery cell stacks which are connected in series comprises several hundred battery cells.

7. The battery according to claim 5, wherein the battery comprises two to four battery cells per parallel circuit.

8. The battery according to claim 1, wherein an arrangement of battery cells in a battery housing mechanical manufacturing tolerances are almost compensated by the welding connections of the pairs of pole connections.

9. The battery according to claim 8, wherein the battery cells are electrically connected with cell supervision modules or with cell supervision circuits via a wire harness, a flex board, or a collecting board.

10. The battery according to claim 1, wherein the battery comprises prismatic lithium ion cells.

11. A battery according to claim 1, wherein the battery comprises cell monitoring modules, wherein an individual cell monitoring module comprises an integrated circuit with cell monitoring circuits.

12. The battery according to claim 1, wherein pole connections of the battery cells are ultrasonic-welded in pairs.

13. The battery according to claim 12, wherein several pole connections welded in pairs are ultrasonic-welded to a plurality of welded main connections.

14. The battery according to claim 12, wherein taps for the battery cell monitoring are ultrasonic-welded to pole connection weldings.

15. A method for producing a battery with a plurality of battery cells comprising:
mounting battery cells into a battery housing;
manufacturing pairs of welding connections between pole connections of battery cells, wherein same battery cell pole connections with parallel connections or oppositely poled battery cell pole connections are welded plane with each other to series circuits;
manufacturing a wire harness or a flex board or a collecting board with battery monitoring circuits and/or cell supervision circuits or battery cell monitoring modules and/or cell supervision modules of a charge compensation device with charge compensation lines which comprise taps;
welding the taps of the charge compensation lines for the individual monitoring of battery cells to the welding connections in pairs of the pole connections;
attaching battery external connections to pole connections of the end cells of the battery.

16. The method according to claim 15, further comprising varying, by the charge compensation device, the charge states of the battery cells in such a manner that the charge states of the battery cells are adapted to each other.

17. The method according to claim 15, further comprising storing a charge state voltage curve of the entire system of the battery in the charge compensation device.

18. The method according to claim 15, wherein up to several thousand battery cells are welded in series circuit to each other and up to 50 battery cells are welded in parallel circuit to each other.

19. The method according to claim 18, wherein several hundred battery cells are welded in series circuit to each other.

20. The method according to claim 18, wherein two to four battery cells are welded in parallel circuit to each other.

21. The method according to claim 15, wherein each battery cell is connected with cell supervision modules or cell supervision circuits via a wire harness, a flex board or a collecting board for detecting and/or compensating the charge state of the battery cell.

22. The method according to claim 15, wherein lithium ion cells are used as flat cells in an aluminum composite foil packing, which charge states are detected and adapted by cell monitoring circuits.

23. The method according to claim 15, wherein pole connections of the battery cells are ultrasonic-welded in pairs.

24. The method according to claim 23, wherein several pole connections welded in pairs are ultrasonic-welded to multiple welded main connections.

25. The method according to claim 23, wherein the taps for a battery cell monitoring are welded on the pole connection weldings by means of ultrasound.

* * * * *

UNITED STATES PATENT AND TRADEMARK OFFICE
CERTIFICATE OF CORRECTION

PATENT NO.        : 8,564,244 B2                                        Page 1 of 1
APPLICATION NO.   : 12/995484
DATED             : October 22, 2013
INVENTOR(S)       : Tillmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 425 days.

Signed and Sealed this
Fifteenth Day of September, 2015

Michelle K. Lee
*Director of the United States Patent and Trademark Office*